INVENTOR.
JOHN W. LORENZ

United States Patent Office 3,191,667
Patented June 29, 1965

3,191,667
AIR CONDITIONING SYSTEM AND PUMP CONTROLS THEREFOR
John W. Lorenz, La Crosse, Wis., assignor to The Trane Company, La Crosse, Wis., a corporation of Wisconsin
Filed Dec. 29, 1960, Ser. No. 79,305
3 Claims. (Cl. 165—22)

This invention relates generally to air conditioning systems and more particularly to a pump control sequence for an air conditioning system which provides hot and cold heat exchange fluid simultaneously to a heat exchange unit.

In recent years the air conditioning industry has been attempting to lessen the cost of installation of air conditioning systems and at the same time provide individual control of the heat exchange units so that the occupant can adjust the heat exchange unit to provide the proper temperature for his own particular comfort. This type of system necessitates having both a supply of cold heat exchange fluid and a supply of warm heat exchange fluid available at all time. One of these schemes has become known in the industry as the three-pipe system.

The three-pipe system involves the use of separate hot and cold supply lines to each heat exchange unit in the system. The heat exchange fluid from each heat exchanger is mixed in a common return and returned to the system heater or cooler to be heated and cooled as required by the system. It is obvious that this type of system will be very uneconomical to operate unless some means are provided to direct the return water, depending on the temperature of the return water, to the proper system heat exchanger. In other words, if the return water is predominantly warm the water should be returned to the heater or if the water is predominantly cold the water should be diverted to the cooler.

It is therefore an object of this invention to provide a three-pipe air conditioning system in which the warm return water is returned to the heater and the cold return water is returned to the cooler.

Another object of the invention is to provide an air conditioning system in which the pumps are controlled in sequence to return the warm return water to the heater and the cold return water to the cooler.

A third object of the invention is to provide a three-pipe air conditioning system which employs at least two zones and return water from these zones is returned to the heater or cooler by thermostatically controlled pumps.

Figure 1:
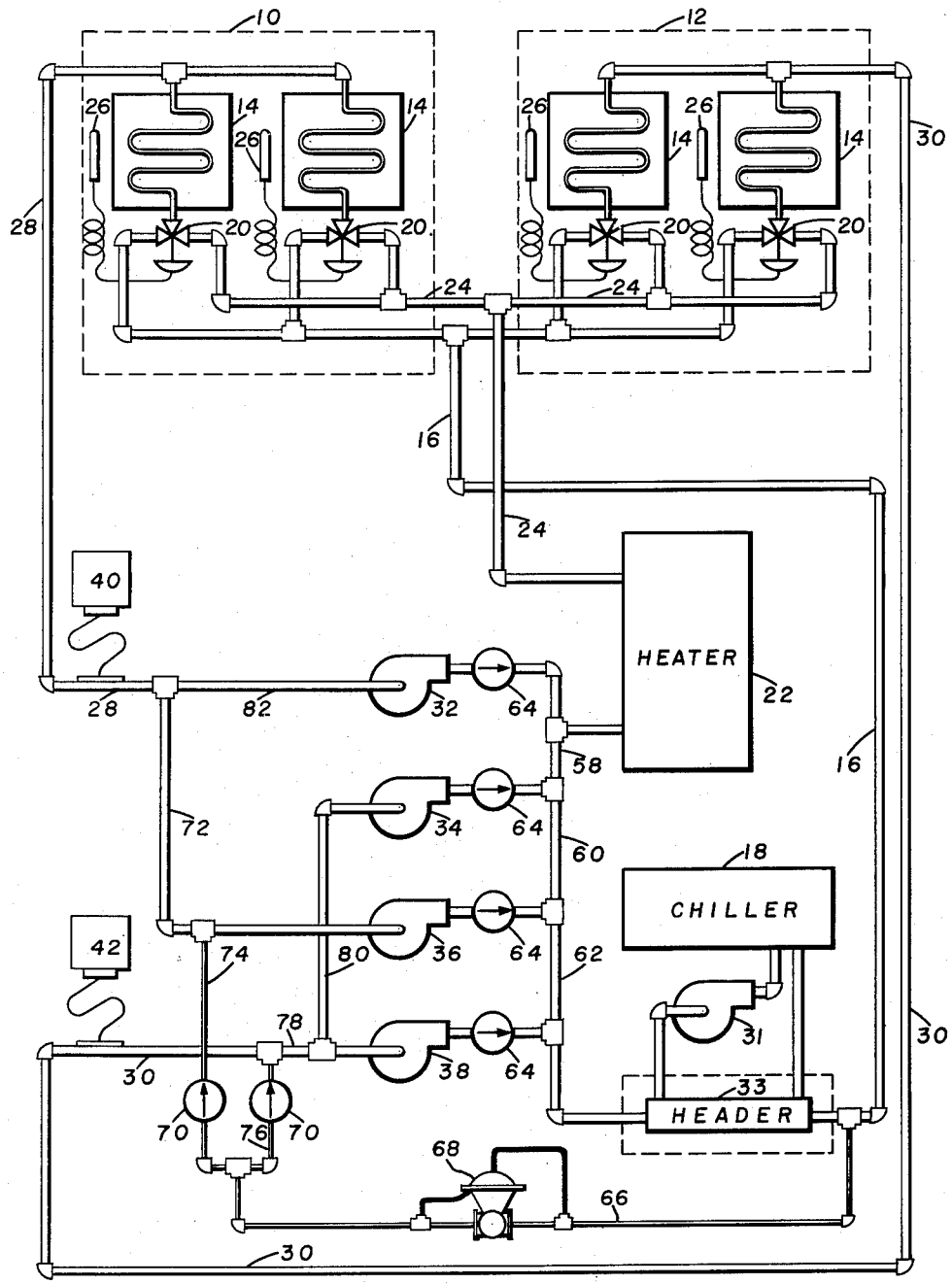
Figure 2:
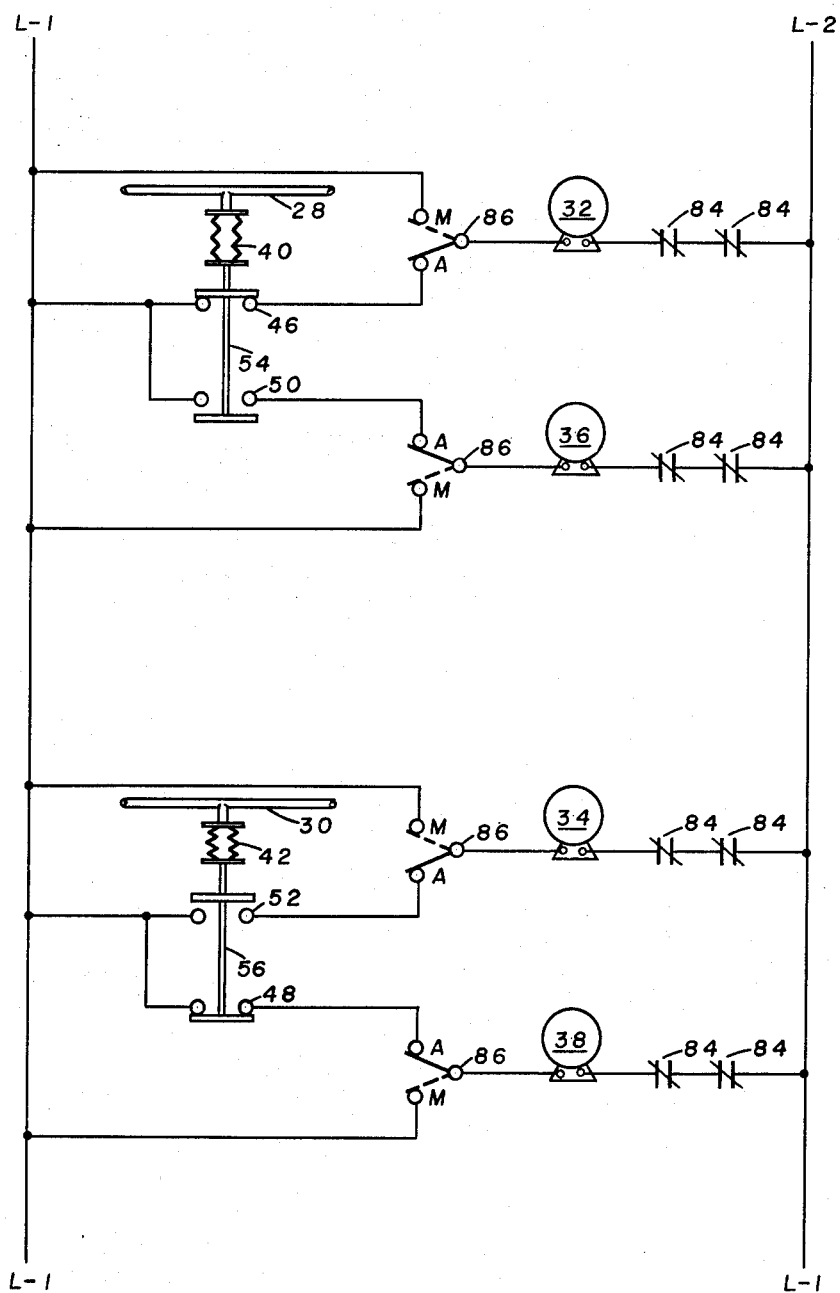

Other objects and advantages of the invention will be clearly apparent as the specification proceeds to describe the invention with reference to the accompanying drawings in which:

FIGURE 1 is a schematic flow diagram of an air conditioning system incorporating my invention; and FIGURE 2 is a circuit diagram showing the pump control on a line to line wiring diagram.

Looking now to FIGURE 1 our new and improved control system is shown applied to an air conditioning system having at least two zones 10 and 12. For the sake of discussion these zones will be denoted as the north zone and south zone respectively. Located within each zone are plurality of heat exchange units 14. The size and number of such units depending on the requirements of the particular areas to be conditioned with the respective zones.

Cold water through conduit 16 from chiller 18 is supplied to thermostatic valve 20 on the inlet side of each heat exchange unit 14. Hot water from heater 22 is also supplied to thermostatic valve 20 of each unit through conduit 24. For the sake of discussion thermostatic valve 20 is shown as a three-way valve but obviously two two-way valves could be employed, if desired.

Thermostatic valve 20 depending on the temperature sensed by the sensing element 26 in the particular area to be conditioned supplies either hot or cold heat exchange fluid to the heat exchange unit 14 conditioning the area. The heat exchange fluid in each zone 10 and 12 is then manifolded and returned in a common zone return to the heater 22 or chiller 18 by way of common return 28 or 30. It is obvious that the return water from one heat exchange unit 14 in a particular zone may be hot and the return water from another unit in the same zone may be cold thereby resulting in a return water temperature which will lie somewhere between the two extreme temperatures.

The chilled water is shown pumped by pump 31 through a header 33 in the chiller loop. This is done so that any amount of water as used by the zones, whether large or small, will have no effect on the constant g.p.m. required by the chiller 18. If desired, the chiller loop may be omitted and the chiller located as shown in dotted lines.

The north zone return line 28 is shown directed to the heater 22 and the south zone return line 30 is directed to the chiller. In all instances the common returns from the zone or zones which are predominately heating zones should be directed to the heater while common returns from the zone or zones predominately requiring cooling should be directed to the chiller. These conditions are readily determined by anyone versed in the art and will not herein be discussed.

In FIGURE 1 pumps 32 and 36 are provided to handle the return water from common return 28 and pumps 34 and 38 are provided to handle the return water from common return 30. In the preferred form of the invention the air conditioning system is divided into only two air conditioning zones but obviously numerous zones may be employed as long as two pumps per zone are provided to handle the return water in the common return from such zones. For simplicity of explanation the preferred embodiment has been limited to only two zones.

Looking now at FIGURE 2 the air conditioning system of FIGURE 1 is assumed to be returning warm water in common return 28 and cold water in common return 30. The control circuit of FIGURE 2 will be in the position shown with temperature controller 40 in the expanded position and temperature controller 42 in the collapsed position. For discussion temperature controllers 40 and 42 are shown as bellows type controls but such particular type of control is only exemplary and other temperature controllers may be employed within the scope of the invention.

With the controls in the above position and switches 86 in the automatic (A) position pumps 32 and 38 will be energized through control contacts 46 and 48 respectively. Pump 32 then will tend to deliver warm return water from common return 28 predominately to the heater 22 and pump 38 will tend to deliver cold return water from common return 30 predominately to the chiller 18. Pumps 34 and 36 will be idle since control contacts 50 and 52 are open.

Assuming now that warm water is being returned from zones 10 and 12 in common return returns 28 and 30, temperature controller 40 will be in the position shown in FIGURE 2 and temperature controller 42 will expand, opening contact 48 and closing contact 52. Pumps 32 and 34 will be energized through contacts 46 and 52 respectively and the warm return water will tend to be directed predominately to the heater 22. Pumps 36 and 38 will be idle since contacts 50 and 48 are breaking the circuit from L-1 to L-2 through the pumps 36 and 38.

If cold water is being returned in common return 28 and warm water is being returned in common return 30 temperature controller 40 will contract and pull control rod 54 upwardly opening contact 46 and closing contact 50. Temperature controller 42 will also be expanded forcing control rod 56 downwardly and closing contact 52 and opening contact 48. Pumps 34 and 36 will be energized through contacts 52 and 50 respectively. Pump 34 will tend to direct the warm return water from common return 30 predominately to the heater 22 and pump 36 will tend to be feeding the cold return water from common return 28 predominately to the chiller 18. Pumps 32 and 38 will be idle since contacts 46 and 48 are open.

The only possible situation left would be when both the returns 28 and 30 are returning chilled or cool water. In this case both the temperature controllers 40 and 42 will be contracted thus closing contacts 48 and 50 and opening contacts 46 and 52. Pumps 36 and 38 will be energized through contacts 46 and 52 and will be pumping heat exchange fluid to the chiller 18. Pumps 32 and 36 will be idle since contacts 48 and 50 are open.

It should be kept in mind that the herein disclosed pump control system is based on the premise that the return water temperatures indicate the type (either hot or cold) of supply water being used by the heat exchange units. In other words, when cold return water is being returned in a particular return the system is taking or using more chilled water than heated water in that particular zone. Therefore the chilled water pumps are grouped so the chilled water pumps are adjacent the chiller and the heated water pumps are adjacent the heater. This tends to pump the warm water to the heater and the chilled water to the chiller. There will be times when the water being pumped from a particular zone towards either the heater or chiller cannot be completely employed by the particular heater or chiller since momentarily the system requirements have changed. A cross-over pipe consisting of conduits 58, 60, and 62 has been provided on the discharge side of the pumps 32, 34, 36, and 38 to allow return water to cross over from one circuit to the other when the unusual circumstance occurs when the water being pumped to either the heater 22 or the chiller 18 cannot be handled by the respective heat exchanger. Check valves 64 have been provided to eliminate the possibility of one pump circulating heat exchange fluid through one of the other pumps.

A differential pressure loop 66 with a differential pressure valve 68 therein is employed to provide pump cooling fluid in the case where the pumps may be running but all the valves 20 in one or more zones may be closed thereby taking no heat exchange fluid. Check valves 70 are provided in the differential pressure loop to eliminate the possibility of pump 34 drawing water from conduit 72, through conduits 74, 76, and 78 into the suction side of the pumps 34 and 38. Check valves 70 also prevent pumps 32 and 36 from drawing water from common return 30, through conduits 76, 74 and conduit 72 into the suction side of the pumps 32 and 36.

Looking at FIGURE 2, overload switches 84 are provided in each pump circuit to cut off the supply of electricity to the circuit in case of an abnormal increase in the amount of current drawn due to some unusual malfunction of the pump or motor.

Each of the pump circuits incorporates a two-position switch 86 which allows either manual (M) or automatic (A) control. FIGURE 2 denotes the automatic operation of the control circuit with switches 86 as shown in solid lines. The manual position of the switches 86 is indicated in dotted lines and it is obvious that placing of any or all of the switches 86 in manual position will bypass the temperature control for the respective pump or pumps. The manual control allows a selected pump to be operated continuously in case of pump cleaning, repair, replacement, etc. This manual switch in conjunction with the use of two pumps for each zone offers greater flexibility since a failure of one pump or even two pumps will not shut down the air conditioning system. The manual control can be so operated to place any desired pump into continuous operation to allow a serviceman to repair or replace the inoperative pump or pumps.

I have described and disclosed herein a new and novel pump control system which allows the use of the basic concepts of three-pipe system without the inherent disadvantages of uneconomic operation. My air conditioning system has the decided advantage of returning the warm water to the heater and the cold water to the chiller. In previous three-pipe systems the return water was totally mixed and then split into two streams for flow to the heater and chiller. Oviously the system is expensive to operate since comparatively warm water would be going to the chiller and comparatively cold water would be going to the boiler. My system eliminates this serious disadvantage by directing the respective streams of heat exchange fluid to the proper heater or chiller by measurement of the temperature of the respective stream. My system further provides the advantage of having sufficient pumps available to allow the system to operate even though one or two of the pumps are out of operation due to a malfunction.

Although I have described in detail the preferred embodiment of my invention, it is contemplated that many changes may be made without departing from the scope or spirit of my invention and I desire to be limited only by the claims.

I claim:

1. In an air conditioning system including first and second zones to be conditioned, a plurality of heat exchange units in each of said zones, a first conduit means for supplying a warm heat exchange fluid to each of said heat exchange units in each of said zones, a second conduit means for supplying a cold heat exchange fluid to each of said exchange units in each of said zones, separate valve means connected to each of said heat exchange units and to said first and second conduit means to selectively supply warm or cold heat exchange fluid to said heat exchange units as required, a heater, a cooler, means connecting said heater to said first conduit means, means connecting said cooler to said second conduit means, the improvement comprising: a first common return conduit means operably connected to each of said heat exchange units of said first zone for returning simultaneously spent warm and cold heat exchange fluids therefrom; a second common return conduit means operably connected to each of said heat exchange units of said second zone for returning simultaneously spent warm and cold heat exchange fluids therefrom; a first pump operably connected to said first common return conduit means and said heater; a second pump operably connected to said first common return conduit means and said cooler; a third pump opperably connected to said second common return conduit means and said heater; a fourth pump operably connected to said second common return conduit means and said cooler; and control means for energizing said first pump when the temperature of the heat exchange fluid in said first common return conduit means is above a predetermined value and for energizing said second pump when the temperature of the heat exchange fluid in said first common return conduit means is below a predetermined value, and for energizing said third pump when the temperature of the heat exchang fluid in said second common return conduit means is above a predetermined value and for energizing said fourth pump when the temperature of the heat exchange fluid in second second common return conduit means is below a predetermined value.

2. The device as defined by claim 1 wherein the discharge sides of said first and fourth pumps are connected by a cross-over pipe and said second and third pumps are arranged to discharge fluid into said cross-over pipe intermediate the connections of said first and fourth pumps thereto.

3. The device as defined by claim 2 wherein the connection of said third pump to said cross-over pipe is closer than the connection of said second pump to the connection of said first pump to said cross-over pipe.

References Cited by the Examiner

UNITED STATES PATENTS

| | | | |
|---|---|---|---|
| 2,216,245 | 10/40 | Larson | 236—1 |
| 2,357,706 | 9/44 | Toepperwein | 165—12 X |
| 2,796,740 | 6/57 | McFarlan | 165—29 |
| 2,797,068 | 6/57 | McFarlan | 165—29 |
| 2,915,298 | 12/59 | Hamlin et al. | 165—27 |
| 3,024,008 | 3/62 | Blum | 165—22 |

CHARLES SUKALO, *Primary Examiner.*

HERBERT L. MARTIN, FREDERICK L. MATTESON, JR., *Examiners.*

UNITED STATES PATENT OFFICE
CERTIFICATE OF CORRECTION

Patent No. 3,191,667　　　　　　　　　　　　　　　　　June 29, 1965

John W. Lorenz

It is hereby certified that error appears in the above numbered patent requiring correction and that the said Letters Patent should read as corrected below.

Column 5, line 11, for "second", first occurrence, read -- said --.

Signed and sealed this 7th day of December 1965.

(SEAL)
Attest:

ERNEST W. SWIDER　　　　　　　　　　　　　　　EDWARD J. BRENNER
Attesting Officer　　　　　　　　　　　　　　　　Commissioner of Patents